United States Patent
Kleppner

[11] Patent Number: 6,152,114
[45] Date of Patent: Nov. 28, 2000

[54] CONTROL VALVE FOR A JET PUMP

[75] Inventor: Stephan Kleppner, Bretten, Germany

[73] Assignee: Robert Bosch GmbH, Stuttgart, Germany

[21] Appl. No.: 09/341,243

[22] PCT Filed: Nov. 25, 1998

[86] PCT No.: PCT/DE98/03454

§ 371 Date: Jul. 15, 1999

§ 102(e) Date: Jul. 15, 1999

[87] PCT Pub. No.: WO99/28615

PCT Pub. Date: Jun. 10, 1999

[30]  Foreign Application Priority Data

Nov. 28, 1997 [DE]  Germany ........................ 197 52 963

[51] Int. Cl.[7] ........................................ F02M 37/04
[52] U.S. Cl. ................... 123/514; 137/540; 417/186
[58] Field of Search .................... 137/535, 540; 123/514, 509; 417/182, 186

[56]  References Cited

U.S. PATENT DOCUMENTS

| | | | |
|---|---|---|---|
| 3,648,728 | 3/1972 | Perry et al. | 137/535 |
| 4,010,721 | 3/1977 | Ludwig | 137/513.3 |
| 4,742,844 | 5/1988 | Szlaga | 137/540 |
| 4,834,132 | 5/1989 | Sasaki et al. | 123/514 |
| 4,842,015 | 6/1989 | Haak et al. | 137/535 |
| 4,913,303 | 4/1990 | Harris | 137/43 |
| 4,926,829 | 5/1990 | Tuckey | 123/514 |
| 5,289,810 | 3/1994 | Bauer et al. | 123/514 |
| 5,564,397 | 10/1996 | Kleppner | 123/514 |
| 5,848,605 | 12/1998 | Baily et al. | 137/540 |

*Primary Examiner*—Thomas N. Moulis
*Attorney, Agent, or Firm*—Michael J. Striker

[57]  ABSTRACT

The invention relates to a overflow valve for a device (1) for pumping fuel, in which the device (1) has a supply container for fuel for an internal combustion engine of a motor vehicle, a catchment (6) disposed in the supply container, a fuel pumping assembly (19) that aspirates from the catchment (6) and communicates on the pressure side with the engine, a return line (2) from the engine or a direct branch (33) from the pressure line (20) to the supply container, and a fluid entrainment pump (3) communicating with the return line (2) or the branch and disposed in the supply container, by which pump fuel is pumped into the catchment (6), and the overflow valve (22) closes or opens a overflow opening (4) to the fluid entrainment pump (3). The overflow valve has a spirally shaped spring (12), which holds a closing member (7) and presses it vertically in the direction onto the overflow opening (4).

10 Claims, 3 Drawing Sheets

CONTROL VALVE FOR A JET PUMP

The invention is based on a overflow valve, which is used as a control valve in an apparatus for pumping fuel. The apparatus has a supply container for fuel for an internal combustion engine of a motor vehicle, a catchment disposed in the supply container, a fuel pumping assembly that aspirates from the catchment and communicates on the pressure side with the engine, a return line from the engine or a direct branch from the pressure line to the supply container, and a fluid entrainment pump communicating with the return line or the branch and disposed in the supply container. By means of the fluid entrainment pump, the fuel is pumped into the catchment, and the overflow valve closes or opens a overflow opening to the fluid entrainment pump.

One such apparatus is known from German Patent Disclosure DE 44 26 667 A1. There the overflow opening is closed by a ball, which rests on a valve seat of the overflow opening. Lateral guidance of the ball is affected via ribs in such a way that the ribs can move only vertically away from or toward the overflow opening. The vertical motion is caused by two compression forces oriented counter to one another. Once compression force is created by fuel that flows through a jet nozzle of the fluid entrainment pump. The other compression force is caused by a spring element. The spring element is L-shaped, and the shorter leg of this shape is fastened in a carrier, so that the other, long leg, as a unilaterally fastened spiral spring, presses against the ball.

ADVANTAGES OF THE INVENTION

The overflow valve of the invention in an apparatus for pumping fuel to the internal combustion engine of a motor vehicle has the advantage that the use of a spirally shaped spring makes extremely precise control of the fluid entrainment pump possible. The spirally shaped spring has a shallow characteristic curve, which can be adjusted so precisely that a very sensitive control of the fluid entrainment pump can be performed. Uncovering of the overflow opening to allow fuel to flow out of the fluid entrainment pump can be adjusted by means of the type of spring and the attendant precision in such a way that a desired pressure in the fluid entrainment pump of between 0.25 and 2.5 bar can be controlled as required, with only extremely negligible deviation.

Advantageous features and refinements are recited in the dependent claims.

One advantageous refinement provides that the spring is integrated in one piece with a securing system. As a result, the labor involved in producing the spring and installing it is kept low. Furthermore, the one-piece nature of the securing system and the spring makes it possible to assure a precision fit by way of the production tool. Jointly manufacturing the spring and securing system means that in the later installation, care need be taken merely for the fastening of the securing system. The location of the spring in the securing system remains assured by adherence to the specified tolerances in manufacture. To that end, the securing system has a base, which is secured to the catchment by means of a seat provided for it. The base has barbs, for instance, to prevent unintended loosening in the seat.

The securing system itself preferably has a frame, in the middle of which the spring is disposed. On the one hand, in this way the frame stabilizes the spring. On the other, a suspension of the spring that makes adequate safety possible in operation is assured. A further advantage of using the frame is the attendant rigidity of the securing system. As a result, the securing system becomes invulnerable to impacts, jarring or other exertions of force of the kind that occur in conventional product ion processes and the attendant transportation and storage. The high rigidity also makes it possible for such machining steps as bending or a heat treatment not to impair the adherence to tolerances. A further advantage is obtained in assembly. The frame itself is simple to grasp and to insert into the seat intended for it. Because the securing system is in one piece, there is no need for very complicated and tedious fastening of smaller components.

Disposing the spring in the middle of the frame assures that the stability of the frame acts on all sides of the spring. This also provides protection for the spring against damage from outside. A corresponding embodiment of the base or bases is capable of preventing the spring from being damaged, for instance if the securing system is unintentionally dropped during assembly. only th e frame and the associated bases can contact the floor in that case . Th e spring in turn can not strike a flat floor and be damaged in the process. This advantage applies not only to the spring but also to a valve secured to the spring. Since in the installed state in the apparatus this valve is meant to be seated on a valve seat, damage to the valve would mean rejection of the product.

In another advantageous feature, the valve, which is the closing member for the overflow opening of the fluid entrainment pump, is an umbrella valve. On the one hand, this permits accurate seating of the umbrella valve on a valve seat of the overflow opening. on the other, when the umbrella valve lifts from the overflow opening, it is assured that a uniform outflow of fuel from the fluid entrainment pump through the overflow opening is assured. This prevents interfering forces, engendered by imbalanced pressure conditions in the fluid entrainment pump, which must additionally be compensated for in the control process, from occurring.

In a preferred feature of the umbrella valve, the umbrella valve is made from an elastomer. The elastomer has the advantage, because of its elastic deformability, of being capable of adapting precisely to the valve seat. Thus less stringent demands are made of the production of this valve seat than are necessary in other types of valves, such as the known ball. The elastomer also has the advantage of being capable of acting as a quasi-damper for the vibration and impacts occurring in operation of the motor vehicle. This prevents damage to the spring or the valve street. In the sense of this invention, the term elastomer is understood to mean any material that on the one hand is capable of being resistant to the fuel yet on the other has a flexible behavior.

In a further development of a closing member, an umbrella valve is used that has a hard, inelastic inner core, which is coated with an elastomeric material. This may be necessary whenever the closing member is intended to have a certain rigidity or even hardness that the elastomer itself does not have to a sufficient extent. Other refinements also contemplate closing members that comprise partly an elastomer and partly an inflexible material. The inflexible material, such as a steel, is then fastened in the spring or integrally joined to it, while the elastomer is seated on the valve seat.

In pursuit of a further concept, which may also stand on its own, the overflow valve can also be used generally as a closing valve system especially in the line systems of a motor vehicle. To that end, the closing valve system has an umbrella valve and a spring. The spring is spirally shaped and holds the umbrella valve approximately in the middle.

For that purpose, both the spring and the umbrella valve are advantageously embodied as described above.

DRAWING

Further advantageous features, refinements and characteristics are shown in further detail in the accompanying drawing and described in the ensuing description.

Figure 1:
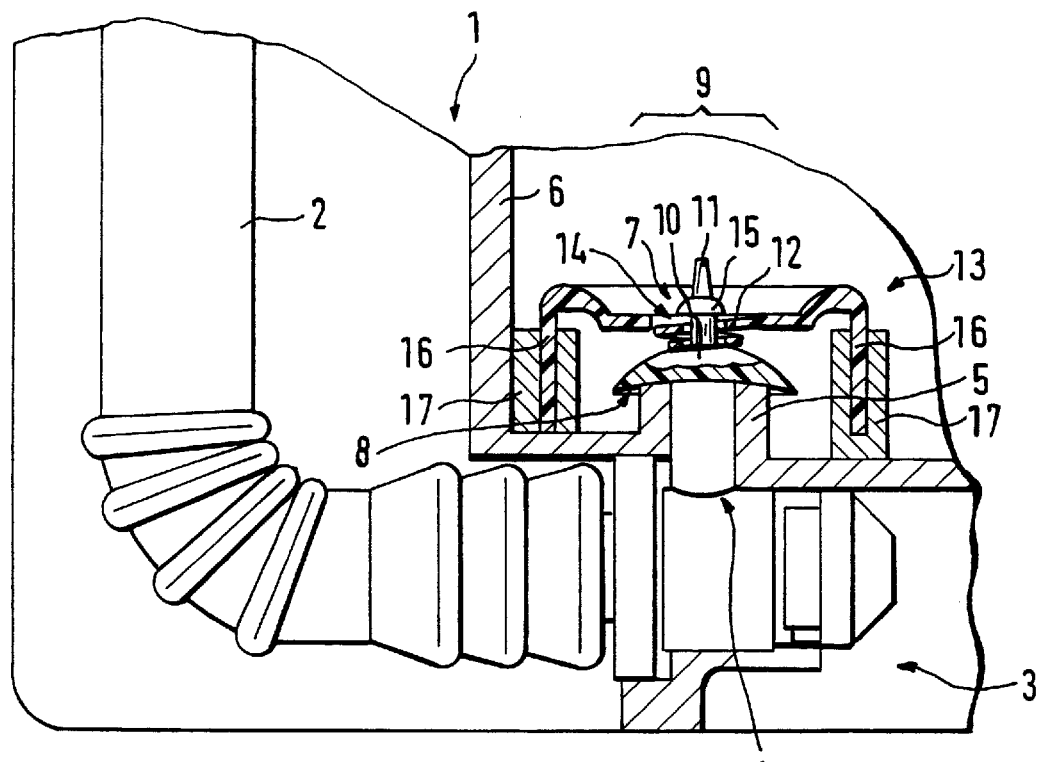
FIG. 1 shows a detail of an apparatus for pumping fuel to an internal combustion engine of a motor vehicle with a overflow valve according to the invention.

FIG. 1 shows a detail of an apparatus 1 for pumping fuel. A fluid entrainment pump 3 is secured to a return line 2. The fluid entrainment pump has a overflow opening 4, so that via a neck 5 fuel can overflow into a catchment 6. As the closing member 7, an umbrella valve 9 is disposed on a valve seat 8 of the neck 5. The umbrella valve 9 in this version has an umbrella 10 of an elastomer and a rod 11 secured to it that is made of metal. The umbrella 10 is mounted on the rod 11, as a result of which a spirally shaped spring 12, which is joined integrally to a securing system 13, is held in a fastening point 14. To that end, the rod 11 has a thickened portion 15. This thickened portion 15 may also be embodied as an undercut. The elastomer umbrella 10 allows production of the valve seat 8 without excessive production effort and cost. At the same time, because of its adaptability to the valve seat 8, the umbrella 10 provides uniformly tight closing on all sides. In engine operation, the spring 12 is always under pressure; that is, the overflow opening 4 is open. The spacing between the umbrella 10 and the overflow opening 4 defines the flow rate of the overflowing fuel. This rate is in turn dependent on the pressure that prevails in the fluid entrainment pump 3. If the engine is not in operation, then the umbrella valve 9 rests on the valve seat 8, as shown.

FIG. 1 also shows the securing system 13 with the spring 12 and respective bases 16. The bases 16 are located in corresponding seats 17, and as a result the securing system 13 is permanently secured in the catchment 6. With regard to the design of this connection but also other features of the apparatus, such as the fastening of the fluid entrainment pump, the design of the fluid entrainment pump and the overflow opening 4, and the mode of operation or disposition of the various components, reference is made to the entire contents of DE 44 26 667 A1 already cited above as prior art.

Figure 2:
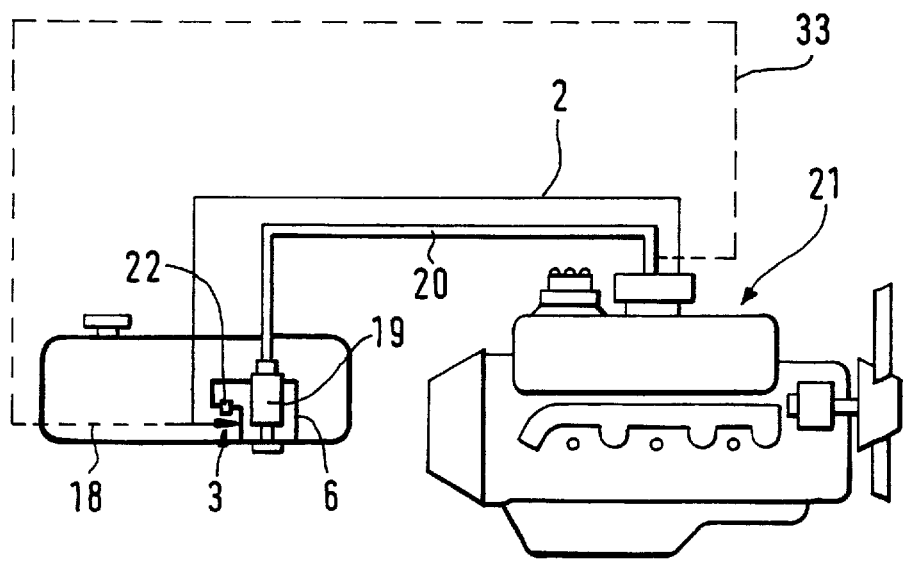
FIG. 2 is a schematic illustration of the apparatus and the engine.

FIG. 2 shows the apparatus 1 for pumping fuel in its entirety in a simplified view. The apparatus 1 has a supply container 18 for the fuel. The catchment 6 is disposed in this supply container 18. By means of a fuel pumping assembly 19, the fuel is carried to the engine 21 via a pressure line 20. Unused excess fuel is returned to the supply container 18 via the return line 2. The fluid entrainment pump 3 at the end of the return line then has a pressure, in the flow nozzle not shown in this view, that is advantageously varied via the selection of the overflow valve 22 in such a way that the catchment 6 is always adequately filled with fuel. Dashed lines also indicate a direct branch 33 from the pressure line 20; the fluid entrainment pump would then be located along with the overflow valve in the extension of the branch 33.

Figure 3:
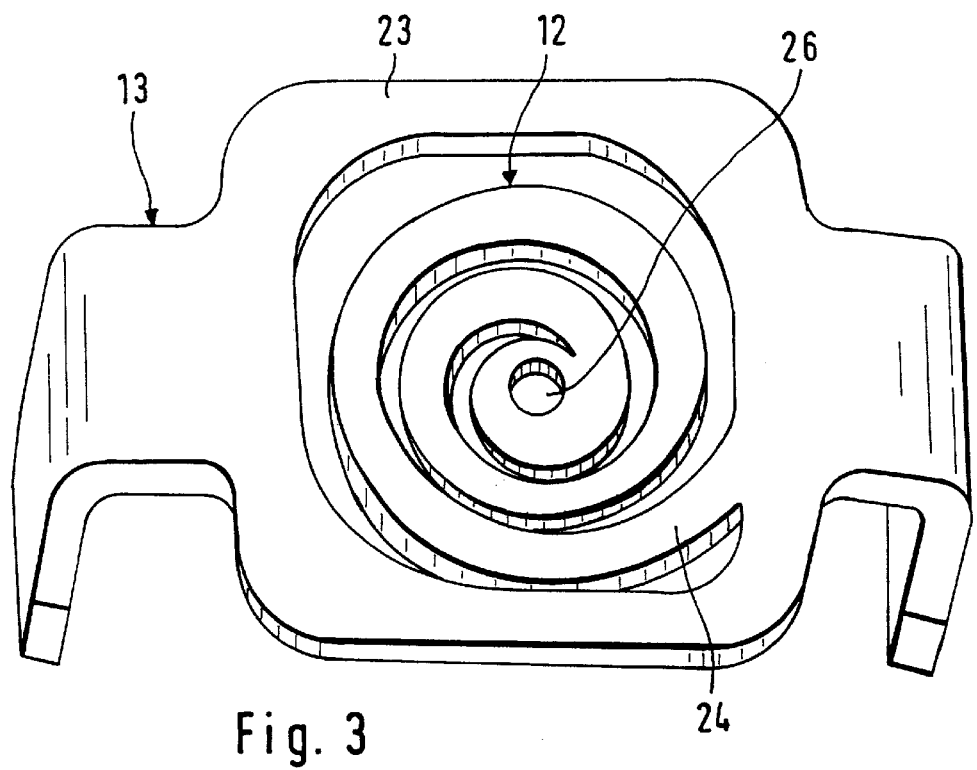
FIG. 3 shows an exemplary embodiment of a spirally shaped spring.

FIG. 3 shows the securing system 13 with the integrated spirally shaped spring 12 in an oblique view. The securing system 13 has a frame 23, in the middle of which the spring 12 extends. The spring 12 in this embodiment has a course 24 that extends in a spiral from an edge 25 of the frame 23 to a center point 26. Both the spring and the entire securing system 13, in this embodiment, are made from a spring steel, for instance by erosion or stamping. To allow a pressure to be exerted in the vertical direction through the spring 12, this spring advantageously has a shape such that it reinforces this vertical exertion of force. To that end, the course 24 may have beveled sides. The spring 12 is also not disposed in a single plane but extends three-dimensionally, as is more clearly seen from the following FIG. 4.

Figure 4:
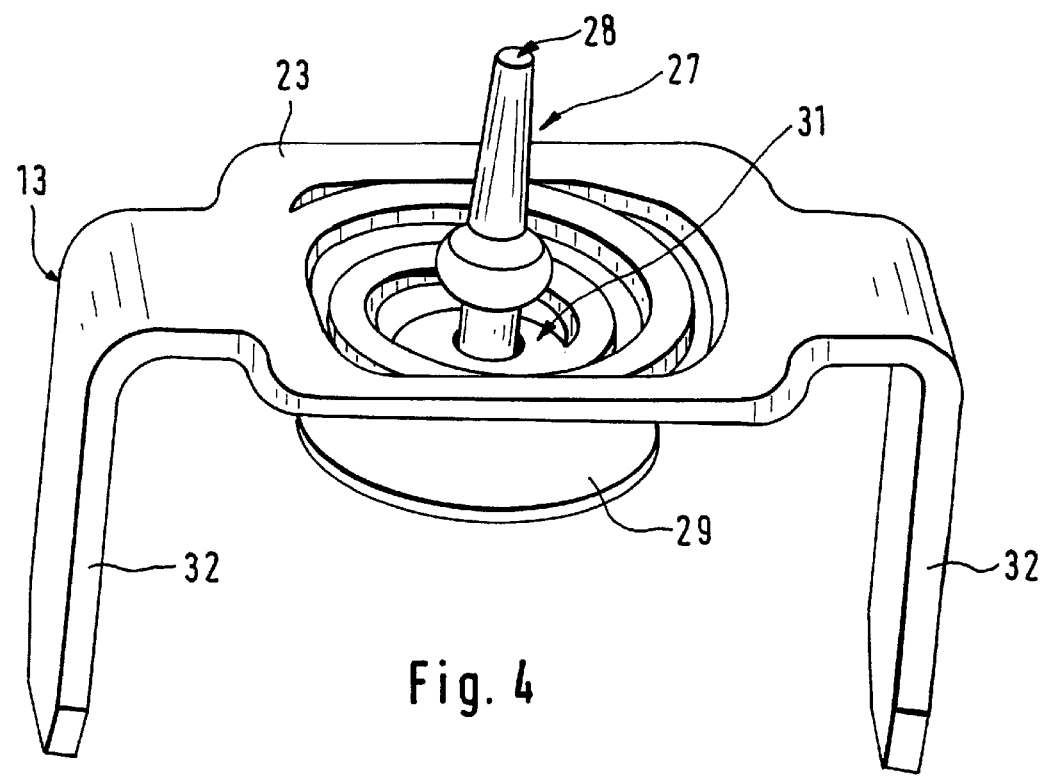
FIG. 4 shows an umbrella valve which is inserted in a spirally shaped spring of FIG. 3.

FIG. 4 shows the securing system 13 on FIG. 3, and whose center point 26 and umbrella valve 26 is now disposed. The umbrella valve 27 is made entirely of an elastomer, so that its rod 28 and umbrella 29 are in one piece. The rod 28 has a bellied area as its thickened portion 30. The thickened portion 30 acts as a counterpart to the umbrella 29 for the spring 12, in order in this way to create a fastening point 31 for the spring. As also seen in FIG. 4, the inserted umbrella valve 27 is shielded by the securing system 13 in such a way that damage to the umbrella 29 is maximally avoided. To that end, bases 32 of the securing system 13 are at least as long as the distance by which the umbrella 29 protrudes away from the fastening point 31. The frame 23 is also larger than a diameter of the umbrella 29, so that lateral protection for the umbrella is also provided.

Figure 5:
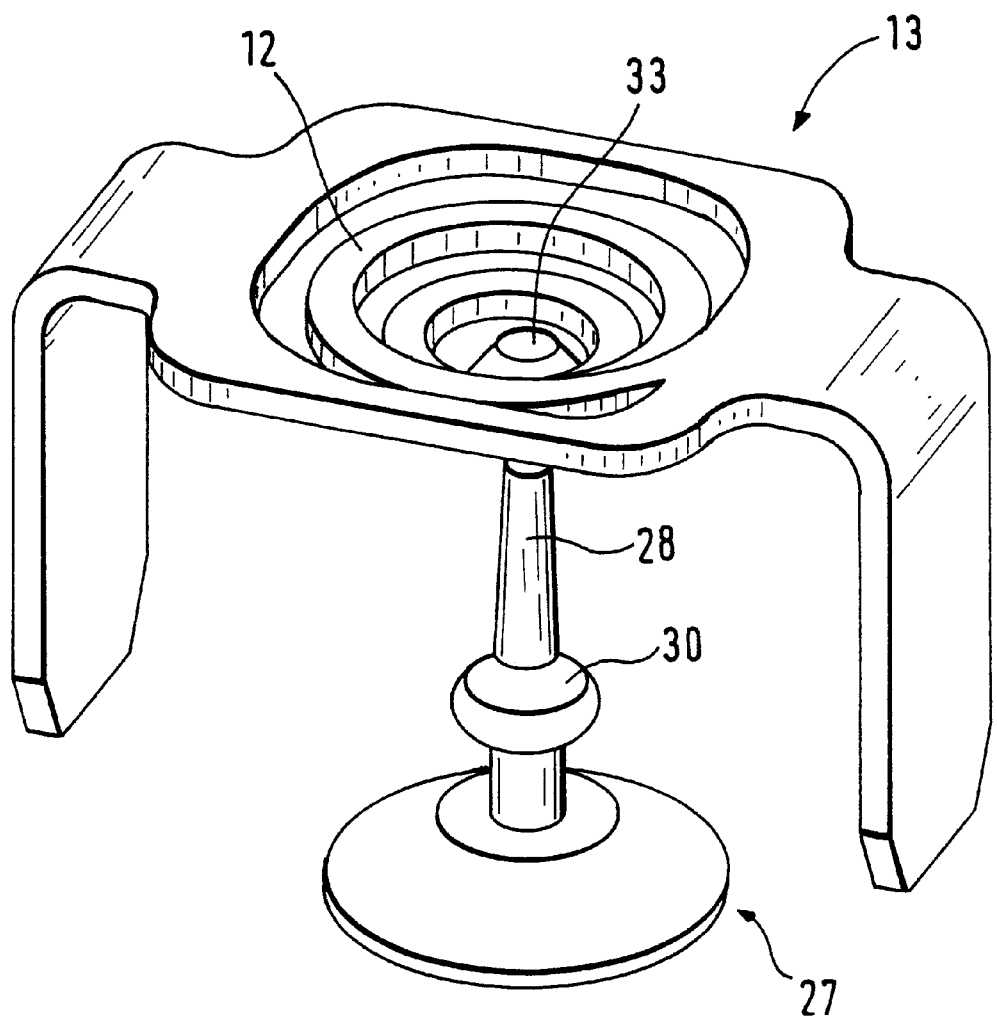
FIG. 5 shows the umbrella valve of FIG. 4 and the securing system with the spring of FIG. 3 before they are put together.

FIG. 5 shows the securing system 13 and the umbrella valve 27 of FIG. 4 before the 2 are put together. The rod 28 is embodied in the form of a mandrel and is inserted through a center opening 33 in the spring 12. In the region of the center opening 33, the spring 12 has a conical internal shape, so that if the rod 28, already partly inserted through the center opening 33, is pulled farther the thickened portion 30 is compressed to such an extent that it passes through the center opening 33. The conical shape acts at the same time as a barrier, which prevents the rod 28 from being pulled back through the center opening 33 again in the opposite direction by the thickened portion 30. The retention of the umbrella valve 27 in the center opening 33 offers the advantage not only of simple installation but also that friction, of the kind known in other systems comprising a closing member and a spring, is omitted. This lack of friction by means of the quasi-internally seated umbrella valve 27 reinforces the high sensitivity of this type of control, which makes it possible for the normal deviations in springs, which are in the range between ±5 N, to be reduced by at least one power.

What is claimed is:

1. A overflow valve (22) for a device (1) for pumping fuel, in which the device (1) has a supply container (18) for fuel for an internal combustion engine (21) of a motor vehicle, a catchment (6) disposed in the supply container (18), a fuel pumping assembly (19) that aspirates from the catchment (6) and communicates on the pressure side with the engine (21), a return line (2) from the engine (21) or a direct branch (33) from a pressure line (20) to the supply container (18), and a fluid entrainment pump (3) communicating with the return line (2) or the branch and disposed in the supply container (18), by which pump fuel is pumped into the catchment (6), and the overflow valve (22) closes or opens a overflow opening (4) to the fluid entrainment pump (3), characterized in that the overflow valve (22) has a spirally shaped spring (12), which holds a closing member (7) and presses it vertically in the direction onto the overflow opening (4).

2. The overflow valve (22) of claim 1, characterized in that the spring (12) is integrated in one piece with a securing system (13).

3. The overflow valve (22) of claim 2, characterized in that the securing system (13) has a base (16; 32), which is secured to the catchment (6) by means of a seat (17) provided for it.

4. The overflow valve (22) of claim 1, characterized in that the securing system (13) forms a frame (23), in the middle of which the spring (2) is disposed.

5. The overflow valve (22) of claim 1, characterized in that the closing member (7) is an umbrella valve (9; 27).

6. The overflow valve (22) of claim 5, characterized in that the closing member (7) has elastomer.

7. The overflow valve (22) of claim 5, characterized in that the closing member (7) is of elastomer.

8. The overflow valve (22) of claim 5, characterized in that the control valve (9; 27) has a centrally mounted rod (11; 28), which has a thickened portion (15; 30) above a fastening point (14; 31) of the umbrella valve (9; 27) to the spring (12).

9. The overflow valve (22) of claim 1, characterized in that the spring (12) has a centrally mounted middle opening (33) as the fastening point (14; 31) for the umbrella valve (9; 27).

10. The overflow valve (22) of claim 1, characterized in that the spring (12) and the umbrella valve (27) are each in one piece.

* * * * *